Figure 1:
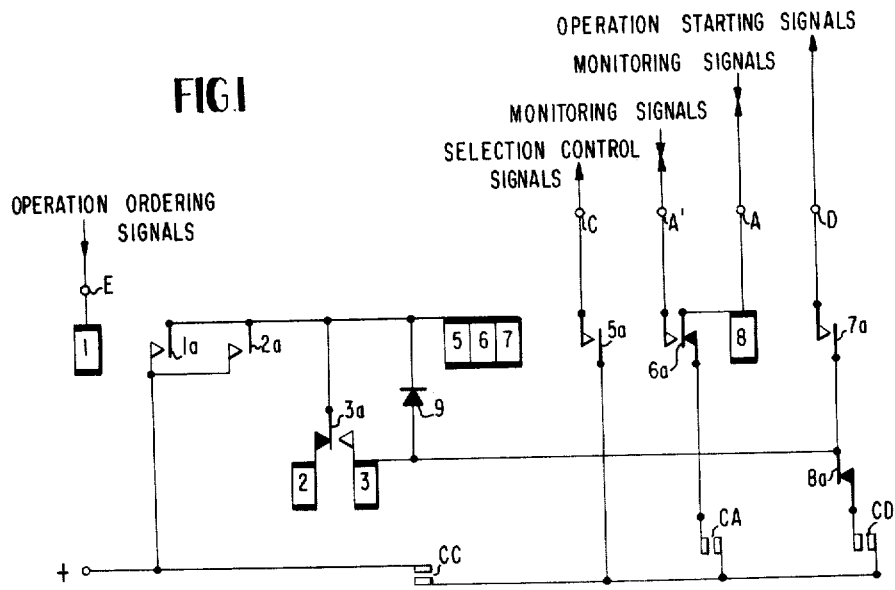

INVENTORS
JACQUES GEORGES LUCIEN HANNICQ
YVES-JEAN FRANCOIS BRETTE

BY *Baldwin + Wright*
ATTORNEYS

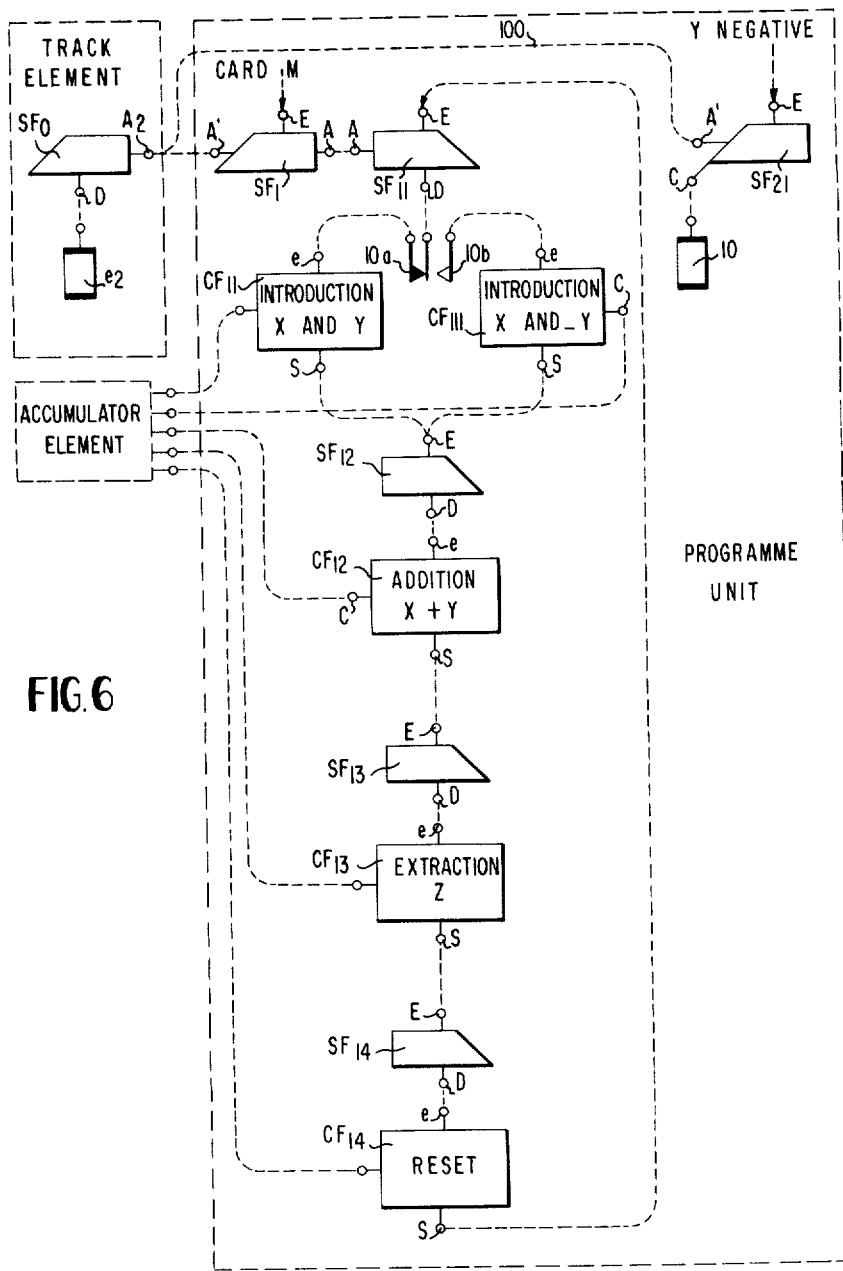

3,174,136
APPARATUS FOR COORDINATING THE OPERATIONS OF VARIOUS SECTIONS OF DATA PROCESSING SYSTEMS
Jacques Georges Lucien Hannicq, Bagnolet, and Yves-Jean Francois Brette, Sevres, France, assignors to Compagnie des Machines Bull (Societe Anonyme), Paris, France
Filed Oct. 24, 1960, Ser. No. 64,588
Claims priority, application France, Nov. 5, 1959, 809,383, Patent 1,252,641
2 Claims. (Cl. 340—172.5)

This invention relates to apparatus for co-ordinating the operation of various sections of data processing systems.

It is known that, for the purpose of providing for the operation of a data processing system, such as a record-card system, for the purpose of carrying out a predetermined work, connections are established between certain contact studs of a switchboard, which latter comprises contact studs connected to members for controlling the various sections of the system and contact studs connected to special auxiliary members called "programming members," which are intended to co-ordinate the operation of the various sections in accordance with the specified programme of work.

These programming members include mainly make-and-break contact relays, selecting devices and cyclic pulse generators for supplying pulses at predetermined instants in the course of certain operating cycles of the various sections of the system.

Systems of the aforesaid type comprise sections which are each capable of operating optionally and the operation of which, when it takes place, is effected in cycles synchronously with the operation of a control or synchronising member.

Generally speaking, these sections perform a cycle of useful operations only after the application of a signal called the "operation starting signal" to a device capable of causing this cycle of operations to be performed. In order that such a signal may be applied, it is necessary not only for the cycle of operations to have been ordered by a signal called the "operation ordering signal", but also that certain conditions are satisfied, the satisfaction of these conditions itself resulting in the application of signals to given connections. The scheme of connections to be established in order that an operation starting signal may be applied in succession to an operation ordering signal only if various desired conditions have been satisfied is often complicated and comprises a large number of programming members and connecting plugs.

One object of the invention is to provide a method of controlling the operation of the various sections of a machine or of a set of machines of the aforesaid type, by reason of which the co-ordination of the operation of these sections with a view to performing certain data processing work can be obtained more readily than has hitherto been possible.

Another object of the invention is to provide a programming device, hereinafter called an "operation selector", which carries out the said method and which is capable of replacing various known programming members and constitutes a novel standard programming member which can be used in all applications.

The invention also concerns particular applications of the said method and of the said operation selector.

A further object is to provide a record-card data processing system such that a number of elemental tasks can be simultaneously performed. It is thus possible automatically to perform, with a single passage of cards, one or more tasks which have hitherto involved manual operations and a number of card passages.

In the method according to the invention, each programming device designed to deliver an operation starting signal after the reception of an operation ordering signal is provided with a member emitting a so-called "monitoring" signal at each cycle in the course of which this programming device is not "validated" the said programming device being described as "validated" from the reception of an operation ordering signal until the delivery of a corresponding operation starting signal. Such a programming device according to the invention is also provided with a member for receiving monitoring signals which is capable of preventing the emission of an operation starting signal by the said programming device in the course of each cycle at the beginning of which a monitoring signal has been applied thereto.

The operation selecting device according to the invention comprises essentially:

A member for receiving operation ordering signals,

Members for processing monitoring signals which are intended to emit, receive and transmit monitoring signals, and the action of which can be controlled by the member for receiving operation ordering signals, A member for emitting operation starting signals which is controlled by certain members for processing monitoring signals, and accessorily:

A member for emitting signals called "selection control signals", which emits a signal at each cycle, in the course of which the operation selector is validated, that is to say, at each cycle from the reception of an operation ordering signal until the emission of an operation starting signal, the said selection control signals being intended to select the operation ordering, operation starting and monitoring signals, in accordance with the requirements of the programming of the system provided with such an operation selecting device.

One of the forms of application of the method according to the invention consists in associating an operation selector with each section whose operation is to be controlled in accordance with a given working programme.

When a machine comprises a number of sections, the operation selectors which are associated with them may be incorporated in the machine and some connections may be established between the various selectors in a permanent manner so as to impose upon the machine a predetermined manner of operation.

The invention is particularly applicable to a system consisting of mechanically distinct elements which may, however, co-operate in the manner of the various members of a common machine with the aid of a synchronising device and a programming device, each of these elements comprising, if desired, a number of sections whose operation takes place in cycles when necessary.

When such a system comprises a large number of elements, its programming by means of the members hitherto employed becomes difficult in some cases. The use of the operation controlling method and of the operation selecting device according to the invention simplifies the programming of this system. The later then comprises, in accordance with one feature of the invention, a "program unit" having the object of co-ordinating the operation of the peripheral elements connected thereto. This programme unit comprises operation selectors which are connected together and to the various sections of the peripheral elements in particular ways so as to impose the conditions of interlinking, simultaneity and exclusion of the operations which must be performed by the various sections of the various elements in accordance with the specified programme of work.

The conditions imposed in the succession and the simultaneity of the operations being thus posted by simple connection, the system then automatically determines the instant of the performance of these operations so as to avoid in any eventuality any waiting period which is not necessitated by the working programme. Owing to the automatic ordering of the operations thus obtained, it is no longer necessary to determine the exact development in time of these operations. It is then possible simultaneously to start any number of elemental programme sequences, whether independent or not, so as to deal simultaneously either with a number of elemental tasks appearing in parallel branches of one and the same programme without necessitating any cycle-by-cycle correspondence in the independent operations, or a number of successive elemental tasks at different levels of the same programme branch, or again different tasks, some of the operations of which can themselves be carried out alternately in one and the same section of the system.

The use of a system thus organized makes it possible not only simultaneously to carry out a large number of operations for dealing with a single task or a number of separate tasks, but also to avoid certain subordinate operations (reproduction, collation, sorting or intermediate calculation).

Figure 2:
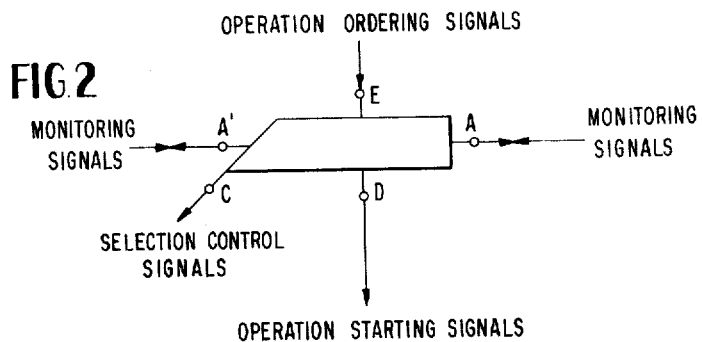
Figure 3:
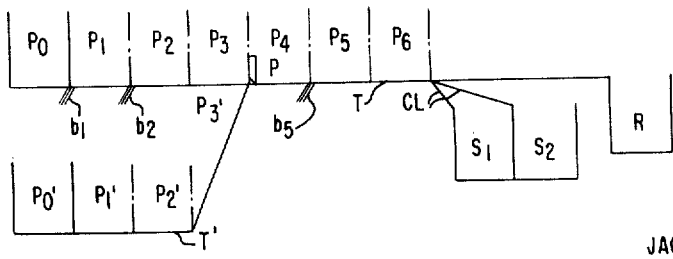
Figure 4:
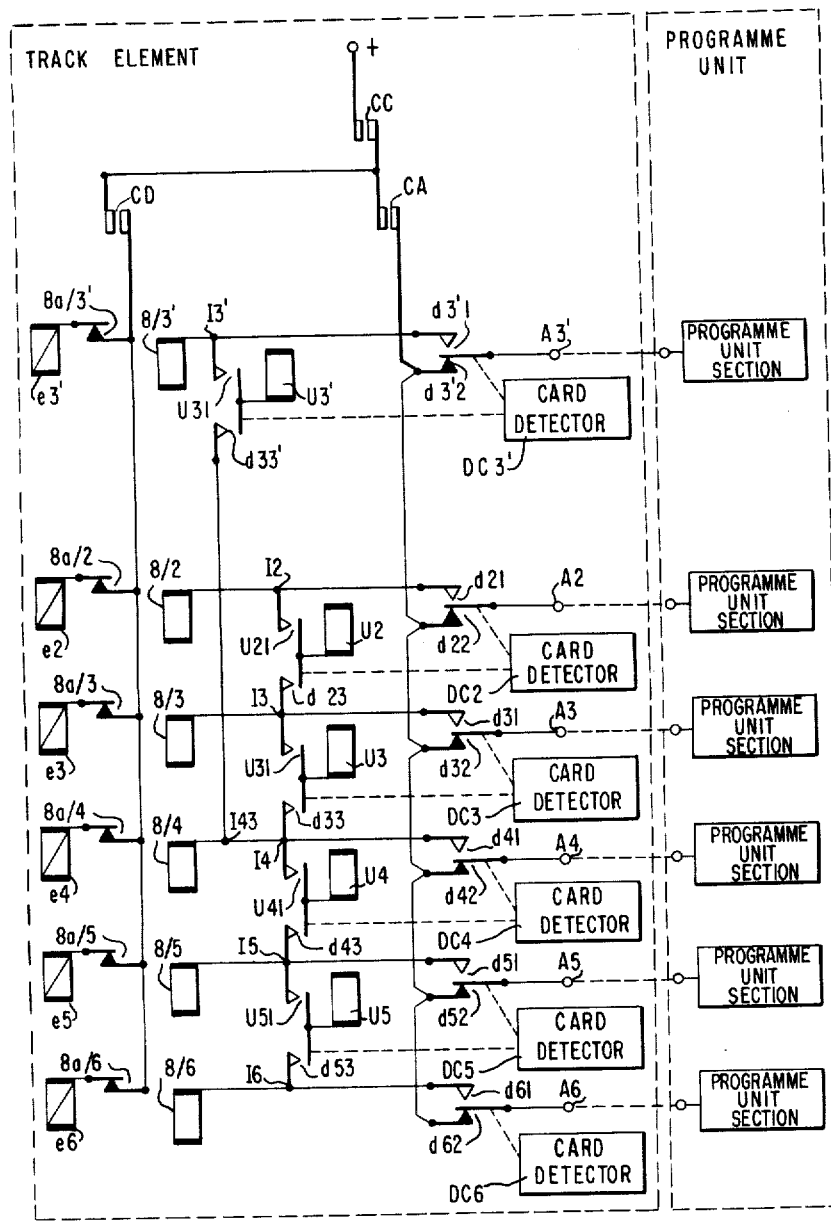
Figure 5:
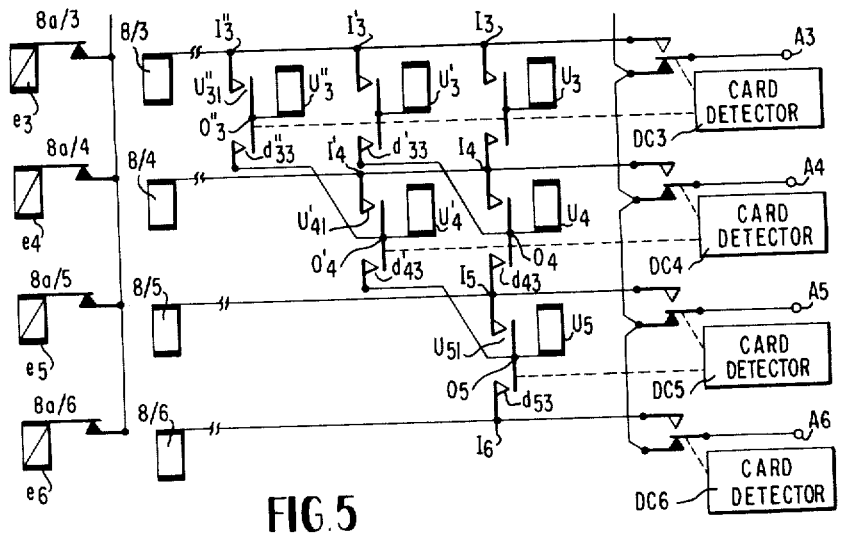
Figure 7:
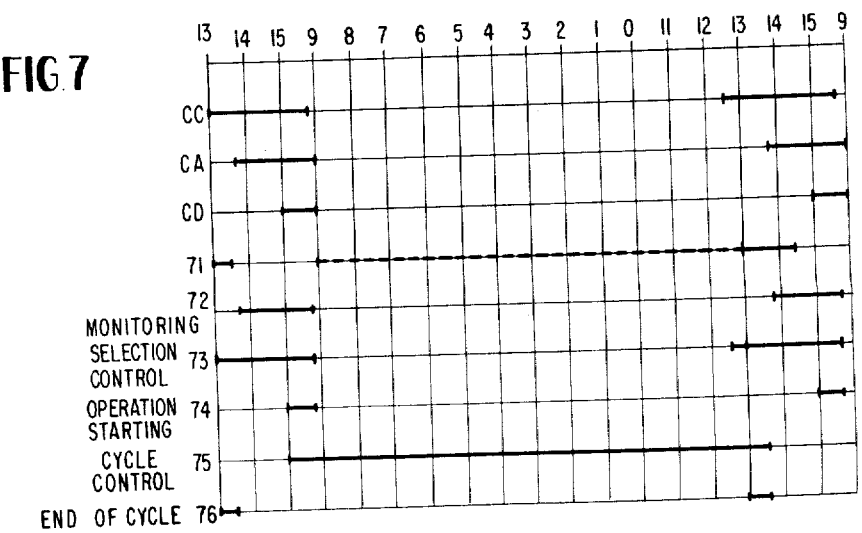

For a better understanding of the invention and the method by which it is to be performed, the same will now be described, by way of example, with reference to the accompanying drawings, in which:

FIGURE 1 illustrates a preferred constructional form of an operation selector according to the invention, FIGURE 2 is a conventional representation of the operation selector, FIGURE 3 is a diagrammatic illustration of a known machine to which the method of the invention is applied, FIGURE 4 illustrates an adaptation of the method and of the operation selecting device according to the invention for imposing upon the machine illustrated in FIGURE 3 a particular method of operation, FIGURE 5 illustrates a variant of the arrangement indicated in FIGURE 4, FIGURE 6 is a diagram of the connections to be made in order to control the operations necessary in performing a particular task in accordance with one example of the application of the method of the invention, and FIGURE 7 illustrates the times of the occurrence of the pulses serving to control the operation of the various members described.

In the diagrammatic illustration of the operation selector which is given in FIGURE 1, the references E, D, A, A′ and C denote connecting contact studs 1, 2, 3 . . . 8 denote relays, 1a, 2a, 3a . . . 8a denote the contacts controlled by these relays, 9 denotes a rectifier element, CC, CA, CD denote contacts controlled cyclically by cams, and the sign + the positive pole of a direct-voltage feed source. The connecting conductors between the above-enumerated elements are represented by lines. One of the ends of the winding of each relay is connected to the negative pole of the voltage source by a means which has been omitted from the drawing for the sake of simplicity.

The operation selecting device is intended to be incorporated in a system operating in cycles, each cycle being divided into 15 points or intervals in the present case. The positioning and succession of these cycle points are indicated by FIGURE 7, which also shows the closing time of the cam-operated contacts CC, CA, CD, as also the times of occurrence of the pulses representing the operation ordering signals (71), the monitoring signals (72), the operation starting signals (74) and the selection control signals (73). The functions of these signals, which have previously been defined, will become apparent from the following description.

The beginning and the end of the operating cycles of the system are located between the points 13 and 14. During that portion of a cycle which is comprised between the points 13 and 9, the control operations generally take place. This portion of the cycle may be denoted by the expression "inter-cycle." During the other part of the cycles, the executive operations take place.

It will be seen that in the inoperative condition of the operation selector as illustrated in FIGURE 1:

The contact studs C and D emit no pulses,

The contacts studs A and A′ are disconnected from one another,

The contact stud A, connected to the cam-operated contact CA, delivers a monitoring pulse at the beginning of each cycle during the inter-cycle (72, FIGURE 7)

It is then said that the operation selector is not validated.

When an operation ordering pulse is applied to the input contact stud E at the beginning of a cycle in the space of time represented by the thick stroke drawn along the line 71 of FIGURE 7 or in the space of time immediately prior thereto and represented by the broken strokes along the same line, the relay 1 is energized and closes its contact 1a. A circuit is thus established for the holding relay 2, which closes its holding contact 2a. At the same time, the relays 5, 6 and 7 become energized, so that the contacts 5a and 7a close, while the contacts 6a are reversed. The relay 3 separated from the positive pole by the rectifier element 9 is not energized. These circuit modifications are maintained, and it will then be said that the operation selector is validated until the application of a pulse to the relay 3, that is to say, as will be seen, until the end of the inter-cycle of the same cycle or of one of the following cycles.

As a result of the circuit modifications hereinbefore indicated, the following takes place:

The control output contact stud C connected to the cam-operated contact stud CC through the closed contact 5a supplies a pulse called the "selection control pulse" (73, FIGURE 7), The contact studs A and A′ are connected together by the reversed contacts 6a, The contact stud A, separated from the cam-operated contact CA by the reversal of the contacts 6a, no longer emits any monitoring pulse, The output contact stud D, connected through the closed contact 7a to the cam-operated contact CD when the contact 8a remains closed, supplies an operation starting pulse at the end of the inter-cycle (74, FIGURE 7). This pulse supplied by the cam-operated contact CD also reaches the winding of the relay 3, of which the contact 3a is reversed, so that the relays 2, 5, 6, 7 are de-energised immediately the inter-cycle ends. If, on the other hand, the contact 8a is open, that is to say if the relay 8 has been energised by a monitoring pulse applied to A or A′ by other members of the system which are connected to these contact studs, the pulse supplied by the cam-operated contact CD at the end of the inter-cycle does not reach the stud D, and also does not reach the relay 3, so that the relays 2, 5, 6, 7 remain energised during the remainder of the cycle. They also remain energised during each of the succeeding cycles in the course of which a monitoring pulse is applied to the relay 8, until the cycle at the beginning of which no monitoring pulse is set up. The contact 8a then remains closed and the cyclic pulse supplied by the cam-operated contact CD is applied to the contact stud D and to the relay 3, so that the relays 2, 5, 6, 7 are de-energised in the course of this cycle at the end of the said pulse.

It will be seen that the selecting device just described comprises:

A member for receiving operation ordering signals (contact stud E, relays 1, 2, 5, 6, 7), Monitoring signal emitting members (cam-operated contact CA, contact stud A), Monitoring signal receiving members (contact studs A and A′, relay 8), Members for transmitting monitoring signals (contact studs A and A′, contact 6a), (The action of the members for processing monitoring signals which have just been enumerated is controlled by means of the contact 6a through the member for receiving the operation ordering signals), A member for emitting operation starting signals (cam-operated contact CD, contact stud D) controlled (through the contacts 7a and 8a) both by the member for receiving the operation ordering signals and by the members receiving the monitoring signals, A member for emitting signals called "selection control" signals (cam-operated contact CC, contact stud C) controlled (through the contact 5a) by the member for receiving operation ordering signals. A selection control signal (73, FIGURE 7) is thus emitted at each cycle commencing from that at the commencement of which the operation ordering signal has been received until the cycle at whose commencement the corresponding operation starting signal is emitted.

In accordance with a modified embodiment of the invention, the winding of the relay 8 may be directly connected to the contact stud A' and, through the contact 6a, to the contact stud A.

Thus, in accordance with the invention, there are available for organising the operation of a data processing system operation selectors of which the contact studs E, D, A, A' and C defined in the course of the foregoing description appear in the switchboard serving for the programming of the system.

FIGURE 2 shows a symbolic representation of these operation selectors. This representation will be employed in the diagram of FIGURE 6.

Operation selectors may also be incorporated in certain elements of the system in order to cause these elements to operate in a predetermined manner. Only some of the contact studs are then accessible and can be connected in accordance with the requirements of the programme.

For obvious reasons of economy and simplicity, the cams CA, CC and CD hereinbefore defined may be common to all the operation selectors combined in one element (programme unit or peripheral element).

A machine in which such operation selectors are advantageously incorporated is described in detail in United States Patent application No. 34,402, filed June 7, 1960, now Patent No. 3,116,922. In such a machine, the feed track along which the cards travel is divided into a number of sections and the operation of each of these sections is optional. In particular, each of these sections is provided with a system for driving the cards which is controlled by a separate clutch.

The machine in question is diagrammatically illustrated in FIGURE 3. The horizontal line T represents the main track, and the broken line T' a secondary track. P0 and P0' represent the card magazines of the tracks T and T', and the spaces P1 to P6 and P1' to P3' various sections of the tracks T and T' respectively. The sections P1, P2 and P5 comprise respectively reading brushes $b1$, $b2$ and $b5$. The section P4 comprises a punching device $p$ and the section P6 a routing system CL for directing the cards towards the receiving compartments S1, S2 or R.

The clutch of the card driving system of each section P3', P2, P3, P4, P5 and P6 is controlled by an electromagnet, $e3'$, $e2$, $e3$ . . . $e6$ respectively (FIGURE 4).

In the present case, it will be assumed that the electromagnets $e2$ and $e3'$ control respectively the conveyance of the cards in the sections P0, P1 and P2 on the one hand, and P0', P1, P2' and P3' on the other hand. It will be obvious that it is possible to provide a separate electromagnet for each of these sections and an independent control circuit for each electromagnet.

As will be seen from FIGURE 4, the windings of the electromagnets $e3'$, $e2$, $e3$ . . . $e6$ are connected in parallel through the contacts $8a/3'$, $8a/2$, . . . $8a/6$ of the relays $8/3'$, $8/2$ . . . $8/6$ respectively, to a cam-operated contact CD supplying a clutch engagement pulse, that is to say, an operation starting pulse, at a predetermined instant of the cycle of operation of the machine (see FIGURE 7).

Each relay $8/n$ ($n$ being capable of taking the values $3'$ and 2 to 6 in the described example) may be connected to a contact stud A$n$ by the normally open contact $dn1$ of a card detector DC$n$. The said normally open contact $dn1$, which is shown open in FIGURE 4, that is to say, in the inoperative condition, is closed when a card is present on the track section P$n$.

The contact studs A3', A2 . . . A6 are connected to different sections of a programme unit which is organised to apply a monitoring pulse to a contact stud A$n$ in the course of a cycle, slightly before the emssion of the operation starting pulse by the cam CD, if no operation is to take place on the track section P$n$ in the course of the cycle.

If a card is present at the beginning of a cycle on a track section such as P6', the card detector DC6 closes the contact $d61$, so that the relay $8/6$ is brought under the control of the programme unit. If a monitoring pulse is then applied by the programme unit to the contact stud A6, the relay $8/6$ energised by this pulse opens the contact $8a/6$, with the result that energisation of the electromagnet $e6$ by the pulse of the cam-operated contact CD is prevented, and consequently the section P6 cannot be fed with cards during the corresponding cycle.

It will be apppreciated that such prevention renders necessary the simultaneous prevention of the feeding of cards to the preceding track section P5 if a card is also situated on this section in order to prevent this card from colliding with that already stopped on section P6. A branch is therefore provided between the points $I_6$ and $I_5$ to direct to the relay $8/5$ the monitoring pulse applied by the programme unit at A6. This branch comprises a contact $d53$ closed by the card detector DC5 when a card is situated on the section P5 and, in order to allow monitoring pulses to pass only in one direction, this branch comprises in addition a contact $u_{51}$ closed by the relay $u_5$ when the latter is energised by the monitoring pulse set up at $I_6$.

A branch $I_5I_4$, similar to the branch $I_6I_5$ is provided to direct to the releay $8/4$, when the contact $d43$ is closed, any monitoring pulse applied by the programme unit at A6 and simultaneously transmitted to $8/6$ and $8/5$, as hereinbefore indicated, or a monitoring pulse applied by the programme unit to A5 and transmitted by the contact $d51$ closed as a result of the presence of a card on the section P5.

Branches $I_4I_3$, $I_3I_2$ and $I_{43'}J_{3'}$ similar to $I_6I_5$ and $I_5I_4$ are likewise disposed between the relays $8/4$ and $8/3$, $8/3$ and $8/2$, $84$ and $8/3'$, so as to preveent during the course of a cycle the feeding of cards to any track section containing a card when a card is also situated on the following section and the feeding of cards is prevented on this following section in the course of this cycle. It will be seen, for example, that if a card is situated on each section P2 to P6 and a monitoring pulse is applied by the programme unit to the contact stud A6 of the last section P6, this pulse is transmitted not only to $8/6$, but alto to all the other relays $8/5$ to $8/2$ because the contacts $d53$, $d43$ . . . $d23$ of the branches are then situated in a closed position as a result of the presence of cards on the different sections. No card is therefore conveyed in the course of this cycle.

The contact $u_{(n-1)1}$ disposed in each branch $I_nI_{n-1}$ closes only if a pulse is applied to $I_n$. It will be seen, for example, that if each of the sections P5 and P6 contatins a card and a monitoring pulse is applied by the programme unit to the contact stud A5, the contacts $d51$, $d53$ and $d61$ are closed, while the contact $u_{51}$ remains open in the absence of a monitoring pulse at $I_6$. Consequently, the monitoring pulse set up at the contact stud A5 is not transmitted to the relay $8/6$ and the feeding takes place on the track section P6, while it is prevented on the section P5.

It will be seen from FIGURE 4 that contacts $d3'2$, $d22$, $d32 \ldots d62$ open when the contacts $d3'1$, $d21$, $d31 \ldots d61$ close under the control of the card detectors $DC3'$ and $DC2$ to $DC6$, owing to the presence of cards on the corresponding track sections $P3'$ and $P2$ to $P6$. The opening of one of these contacts $dn2$ has the effect of cutting off the corresponding contact stud $An$ from a cam-operated contact CA which supplies a monitoring pulse at a given instant of the cycle of the machine (see FIGURE 7). When $dn2$ remains closed owing to the absence of any card on the section $Pn$, this monitoring pulse is transmitted by a contact stud $An$ to the corresponding section of the programme unit and has the effect of preventing the operations controlled by this section. When, on the other hand, the contact $dn2$ is open as a result of the presence of a card on the track section $Pn$, the monitoring pulse emitted by the cam-operated contact CA does not reach the corresponding section of the programme unit.

It may be seen that each of the circuits controlling a track section is an operation selector as previously defined.

Considering, for example, the control circuit corresponding to the section $P3'$ (this circuit has been illustrated in thick lines in FIGURE 4), there will be seen the operation ordering signal receiving members consisting of the card detector $DC3'$ and the contacts which it controls, monitoring signal processing members comprising a contact stud $A3'$, a contact stud $I43$, and the relay $8/3'$, the functions of which correspond respectively to those of the contact studs A and $A'$ and of the relay 8 of the operation selector illustrated in FIGURE 1, and finally operation starting signal emitting members consisting of the circuit comprising the cam-operated contact CD and its connection to the electromagnet $e3'$.

In order to take account of the technological conditions generally necessary, it is desirable to complete the circuit illustrated in FIGURE 4 in the manner indicated in FIGURE 5.

In fact, the presence on a branch such as $I_6I_5$ (FIGURE 4) of the contacts $u_{51}$, which close only after the energisation of the relay $u_5$ by the monitoring pulse to be transmitted between the contact stud A6 and the relay $8/5$, brings about a delay in the transmission of this pulse between $I_6$ and $I_5$. If this pulse is also to be transmitted between $I_5$ and $I_4$, a further delay is added to that produced in the transmission of the pulse between $I_6$ and $I_5$.

In order to obviate this disadvantage, a branch $O_5I'_4$ is arranged in parallel, as indicated in FIGURE 5, with that circuit portion which comprises the contacts $u_{51}$ and the branch $I_5I_4$. This branch $O_5I'_4$ comprises a contact $d'43$ closed by the card detector DC4 when a card is situated on the track section P4 and a contact $u'_{41}$ closed by a relay $u'_4$ when the latter is energised by a monitoring pulse applied by the programme unit to the contact stud A6 and set up at the point $O'_4$.

Similar branches to $O_5I'_4$ are disposed in the same manner from any point $O_n$, $O'_n \ldots O_n{}^p$, as clearly illustrated in FIGURE 5.

When all the track sections are occupied by cards, and a monitoring pulse is applied to A6, this pulse is then transmitted to each of the relays $8/5$, $8/4$, $8/3 \ldots$ by circuits which each introduce only the delay due to the closing of a single relay contact. Thus, the circuit connecting the point $I_6$ to the relay $8/3$ comprises the contacts $d53$, $d'43$, $d''33$, closed as a result of the presence of cards on the track sections P5, P4, P3, and the contact $u''_{31}$ closed as a result of the energisation of the relay $u''_3$ by the inhibiting pulse appearing at $O''_3$.

There has been described with reference to FIGURES 4 and 5 a particular method of using operation selectors in a record-card processing machine called a "track element" of the type described in the application previously mentioned.

In the following description it will be shown with reference to an example how the operation selectors are used as standard programming members for co-ordinating the operation of various sections of a data processing system.

The following problem will be considered in this example: assuming cards M and N mixed in a card set, each of the cards M bears two numbers X and Y, Y being either positive or negative. It is desired:

(1) To effect for each card M the addition $X+Y$ and to extract the sum Z, (2) Not to subject the cards N to any processing and not to modify their position in the card set, and (3) To perform the necessary operations while avoiding all unnecessary cycles.

For carrying out this task, a system will be employed which comprises a track element of the type described in the aforesaid application, an accumulator element of the type employed in punched-card computers, and a programme unit, of which it is sufficient to know that it comprises means for synchronising the operation of the peripheral elements, that is to say, the track element and the accumulator element in the present case, and programming members. The system is caused to carry out the desired working programme by connection of flexible conductors between the contact studs of a switchboard mounted on the programme unit.

FIGURE 6 shows the diagram of the connections to be established between the programming devices of the system in order to obtain the desired result. $SF_0$ represents the operation selector incorporated in the track element for controlling the operation of the section P2 as hereinbefore described. A2 is the corresponding monitoring contact stud also illustrated in FIGURES 3 and 4. $SF_1$, $SF_{11}$ to $SF_{14}$ and $SF_{21}$ are operation selectors of the standard type illustrated in FIGURE 2. The rectangles $CF_{111}$ and $CF_{11}$ to $CF_{14}$ represent devices called "function cycles." These function cycles have the object of emitting by means of their contact stud $c$, each time they receive an operation starting pulse at their contact stud $e$, a "cycle control" pulse (75, FIGURE 7) having the object of causing a cycle of necessary operations to be carried out by those sections of the system to which they are connected and to indicate by an "end-of-cycle" pulse (76, FIGURE 7) emitted by their contact stud that this latter has been performed.

The function cycles $CF_{11}$ to $CF_{14}$ and $CF_{111}$ therefore each have the object of controlling a cycle of elemental operations of the given work programme, that is to say, respectively: the introduction of the numbers X and Y into the accumulator element, the operation of addition $X+Y$, the extraction of the sum $Z=X+Y$, the re-setting of the accumulator element and the introduction of X and $-Y$ into the accumulator element.

The contact studs $c$ of these function cycles are therefore connected to appropriate control members of the accumulator element and of the track element.

As will be seen from FIGURE 6, each function cycle is connected by its contact studs $e$ and $s$ respectively to the contact stud D of the operation selector which is associated therewith and to the contact stud E of the operation selector associated with the function cycle controlling the succeeding operation cycle of the programme. The contact stud $s$ of the function cycle $CF_{14}$ controlling the last operation cycle of the programme is connected to the contact stud E of the operation selector $SF_{11}$ associated with the function cycle controlling the first operation cycle. A programme loop is thus formed.

It will be seen that the contact studs $e$ of the function cycles $CF_{11}$ and $CF_{111}$ are alternately connected to the contact stud D of the operation selector $SF_{11}$ through make-and-break contacts $10_a$ and $10_b$ of the relay 10, the winding of which is connected to the contact stud C of the operation selector $SF_{21}$.

Finally, it will be assumed that a selecting device not shown, which could be of the type mounted on tabulating machines, is connected in known manner to the reading brush $b_1$ of the station $P_1$ of the track element in such manner that an operation ordering pulse is applied to the contact stud E of the operation selector $SF_1$ at the latest at the beginning of the cycle following that during which a card M has been detected by the said reading brush, and that at the commencement of this same cycle an operation ordering pulse is also applied to the contact stud E of the operation selector $SF_{21}$ if the number Y borne by the card M is negative.

When the set of cards has been placed in the magazine $P_0$ of the track element and the system has been started, and the checks usual in this type of system have been carried out following this starting, an operation ordering pulse is applied by members not shown in the drawing to the contact stud E of the operation selector $SF_{11}$, which is thus validated. Consequently, its contact stud A does not emit any monitoring pulse until the operation starting pulse has been emitted by its contact stud D. On the other hand, the contact stud A of the operation selector $SF_1$ emits a monitoring pulse at each cycle as long as its stud E has not received an operation ordering pulse, that is to say, as long as a card M has not passed under the brush $b_1$ of the station $P_1$, and the operation selector $SF_{11}$ receiving this monitoring pulse at its contact stud A does not supply any operation starting pulse.

As soon as the system has been started, a first card is extracted from the magazine $P_0$ in the course of the first cycle and reaches the station $P_1$. In the course of the second cycle, it passes under the scanning brush $b_1$ of the said station and reaches the station $P_2$, while the second card of the set is extracted from the magazine and is brought to the station $P_1$. In the course of the third cycle, a third card is extracted from the magazine, while the second card passes under the scanning brush $b_1$ of the station $P_1$ and the first card passes under the brush $b_2$ of the station $P_2$.

If, as may be assumed by way of example, the said first card is a card N, no pulse has been applied to the contact stud E of the operation selector $SF_1$ at the beginning of this third cycle, and as has previously been explained, the stud D of the operation selector $SF_{11}$ consequently does not emit an operation starting pulse. If the second card is a card M, the brush $b_1$ detects this card M in the course of this third cycle, so that at the beginning of the fourth cycle an operation ordering pulse is applied to the contact stud E of the operation selector $SF_1$. The contact stud A of the latter is then connected to its contact sud A' and emits no further monitoring pulses, so that the contact stud D of the operation selector $SF_{11}$ emits, at the beginning of this fourth cycle, an operation starting pulse which is applied, if the contact $10a$ is closed, to the contact stud $e$ of the associated function cycle $CF_{11}$. The contact stud $c$ of the latter emits a cycle control pulse which has the effect of causing during this fourth cycle the performance of the operation of introducing into the accumulator element the numbers X and Y read by the brush $b_2$ on the second card, which is a card M.

If the number Y borne by this card M is negative, an operation ordering pulse is also applied at the beginning of the fourth cycle to the contact stud E of the operation selector $SF_{21}$ and the contact stud C of the latter immediately emits a selection control pulse (FIGURE 7) which has the effect of energising the relay 10 and of reversing the contacts $10a$ and $10b$. The operation starting pulse emitted at the beginning of this fourth cycle by the contact stud D of the operation selection $SF_{11}$ is therefore applied by the contact $10b$, which is then closed, to the contact stud $e$ of the function cycle $CF_{111}$. The contact stud $c$ of the latter consequently emits a cycle control pulse which has the effect of causing the operation of introducing in the accumulator element the numbers X and $-Y$ read by the brush $b_2$ on the second card to be performed in the course of this fourth cycle.

In the course of the fourth cycle, the third card passes under the brush $b_1$. It will first of all be assumed that this third card is a card M. At the beginning of the fifth cycle, an operation ordering pulse having been applied to the contact stud E of the operation selector $SF_1$, the contact stud A of the latter is connected to its contact stud A' and does not emit any monitoring pulses. Since the operation selector $SF_{11}$ has not been validated at the beginning of this fifth cycle, it does not supply any operation starting pulse at its stud D, and its stud A emits a monitoring pulse which is transmitted by the studs A and A', which are now connected, of the operation selector $SF_1$ to the monitoring stud $A_2$ of the operation selector $SF_0$ incorporated in the track element. Consequently, the electromagnet $e_2$ of the clutch of the section $P_2$ does not receive any operation starting pulses at the beginning of this fifth cycle and the third card which is situated on the section $P_2$ of the track remains immobilised.

From this fifth cycle until the operation selector $SF_{11}$ is validated at the end of the treatment of the preceding card M, as will hereinafter be explained, the monitoring pulses emitted by the contact stud A of this selector in fact maintain the operation selector $SF_1$ in the validated state until this instant and are transmitted by the latter to the contact stud $A_2$ of the operation selector $SF^0$ associated with the section $P_2$ of the track. Any monitoring pulse set up at the contact stud $A_2$ is transmitted by the conductor 100 to the contact stud A' of the operation selector $SF_{21}$ and maintains this selector in the validated state if necessary.

It will now be assumed that the third card is a card N. No pulse is applied in this case to the contact stud E of the operation selector $SF_1$ at the beginning of the fifth cycle. The contact studs A and A' of this operation selector are disconnected from one another, so that the monitoring pulse emitted by the contact stud A of the operation selector $SF_{11}$ is not transmitted to the monitoring stud $A_2$ of the operation selector $SF^0$ and a clutch of the section $P_2$ receives an operation starting pulse at the beginning of this fifth cycle. The card N is therefore carried along and replaced by the succeeding card.

It has been seen that in the example under consideration the contact stud $e$ of one of the function cycles $CF_{11}$ and $CF_{111}$ has received an operation starting pulse at the beginning of the fourth cycle. At the beginning of the fifth cycle, the stud $s$ of that one of its function cycles which has received an operation starting pulse emits an end-of-cycle pulse which is applied to the contact stud E of the operation selector $SF_{12}$ and which constitutes an operation ordering pulse for the latter. The contact studs A and A' of this selector not being utilised, its stud D always emits an operation starting pulse as soon as its stud E has received an operation ordering pulse, so that the associated function cycle $CF_{12}$ brings about the performance of the operation of the addition $X+Y$ in the course of the same cycle.

It will be apparent without further explanation that the operations of extracting the sum $Z=X+Y$ and of resetting the accumulator element are necessarily interlinked in the course of the sixth and seventh cycles and that the travel of the cards is then automatically controlled as in the course of the fifth cycle.

At the beginning of the eighth cycle, an end-of-cycle pulse emitted by the contact stud $s$ of the function cycle $CF_{14}$ is applied to the contact stud E of the operation selector $SF_{11}$. Thus, the same conditions again exist as in the third cycle.

The operation hereinbefore described can be summarised as follows: When the first cycle of operations of the processing loop has been ordered, it cannot take place until cards N pass to the station $P_2$. The arrival of a card M in front of the station $P_2$ permits the starting of the processing loop and if, in the course of the processing, a card M is presented to the station $P_2$, it is blocked in front of this station until the next order for the first cycle of operations. The cards N, on the other hand, are permitted to pass during any processing cycle, without the programmer having had to concern himself with their instant of arrival at the station $P_2$.

It is to be noted here, that in this example of application, it is equally well possible to use instead of the track element of the type indicated the well known feeding and scanning devices of a tabulator comprising only a single clutch device. The operation selector $SF_0$ is then of the standard type, its contact stud E is connected to a device emitting cyclic operation ordering pulses and its contact stud D is connected to the electromagnet actuating the clutch.

It has been seen from the example hereinbefore described how a data processing system of the record-card type organised in accordance with the method of the invention can carry out various simultaneous tasks with optimum output. It has also been seen that the organisation of this system is effected by means of a small number of connections and of programming members and that the scheme of connections is extremely simple, so that the application of the method according to the invention to the solution of complex problems is particularly advantageous.

It will be obvious that the method according to the invention is applicable to other data processing systems than those employing record cards, and that many modifications may be made to the constitution of the operation selecting device without departing from the scope of the invention.

We claim:

1. In a cyclically operating record card system comprising a plurality of synchronous cyclically operating sections, each having a control input and being so adapted as to perform an assigned operation in the course of a cycle at the beginning of which a control pulse is applied to its control input, an arrangement for causing any given one of said sections to perform its assigned operation only during such cycles at the beginning of which a particular set of conditions is found to exist in the system, said arrangement comprising:

a plurality of condition signalling means, each assigned to a different one of said conditions, each having a monitor output and each adapted to provide at its output a monitor pulse overlapping said control pulse at the beginning of each cycle when that condition to which it is assigned is not found to exist in the system;

a plurality of control elements, each comprising a control output, a control pulse generator adapted to provide a control pulse at the beginning of each cycle, a relay having a winding and normally closed contacts, a monitor input connected to said winding, and means for connecting said control pulse generator to said control output through said normally closed contacts of said relay;

said arrangement further comprising means for connecting the control input of each section to the control output of selected ones of said control elements, and means for connecting the monitor input of each control element in parallel to the monitor output of the several condition signalling means assigned to a particular set of conditions.

2. In a cyclically operating record card system comprising program means for selectively providing order signals at the beginning of each cycle according to a predetermined program, a plurality of synchronous cyclically operating sections, each having a control input and being so adapted as to perform an assigned operation in the course of a cycle at the beginning of which a control pulse is applied to its control input in response to a related order signal provided by said program means, an arrangement for preventing a selected group of said sections from performing their assigned operations except upon simultaneous occurrence of all the order signals related to the sections of said group, said arrangement comprising:

a plurality of control elements, each comprising a monitor input-output terminal, a monitor pulse generator adapted to provide a monitor pulse overlapping said control pulse at the beginning of each cycle, normally closed contacts, means for connecting said monitor pulse generator to said monitor input-output terminal through said normally closed contacts, order responsive means for opening said normally closed contacts in response to an order signal applied thereto, a control output, a control pulse generator adapted to provide a control pulse at the beginning of each cycle, a relay having a winding and normally closed contacts, means for connecting said winding to said monitor input-output terminal, means for connecting said control pulse generator to said control output through said normally closed contacts of said relay;

said arrangement further comprising means for connecting the control input of each section to the control output of selected ones of said control elements, and means for connecting together the monitor input-output terminals of the several control elements to the control output of which are connected the control input of the several sections of said selected group.

References Cited by the Examiner

UNITED STATES PATENTS

| 2,946,986 | 7/60 | Harrison | 340—172.5 |
| 3,077,579 | 2/63 | Greene | 340—172.5 |
| 3,079,082 | 2/63 | Scholten | 340—172.5 |

MALCOLM A. MORRISON, *Primary Examiner.*

IRVING L. SRAGOW, ROBERT C. BAILEY,
*Examiners.*